(12) United States Patent
Chen et al.

(10) Patent No.: US 12,549,399 B2
(45) Date of Patent: Feb. 10, 2026

(54) PROGRESS STATUS AFTER INTERRUPTION OF ONLINE SERVICE

(71) Applicant: INTERNATIONAL BUSINESS MACHINES CORPORATION, Armonk, NY (US)

(72) Inventors: Dong Chen, Beijing (CN); Yuan Jie Zhang, Ningbo (CN); Ming Lei Zhang, Beijing (CN); Yin Xi Guo, Beijing (CN); Ting Ting Zhan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/301,028

(22) Filed: Apr. 14, 2023

(65) Prior Publication Data
US 2024/0348467 A1    Oct. 17, 2024

(51) Int. Cl.
*H04L 12/18*    (2006.01)

(52) U.S. Cl.
CPC ...... *H04L 12/1831* (2013.01); *H04L 12/1822* (2013.01)

(58) Field of Classification Search
CPC ............ H04L 12/1822; H04L 12/1831
See application file for complete search history.

(56) References Cited

U.S. PATENT DOCUMENTS

| | | |
|---|---|---|
| 11,128,483 B1 | 9/2021 | Surazski |
| 11,372,525 B2 * | 6/2022 | Faulkner ............ H04N 21/8456 |
| 12,057,956 B2 * | 8/2024 | Lal ....................... H04L 12/1831 |
| 2011/0267419 A1 * | 11/2011 | Quinn ................. G06F 3/04842 |
| | | 348/E7.083 |
| 2013/0325972 A1 * | 12/2013 | Boston .................. G06Q 10/10 |
| | | 709/204 |

(Continued)

FOREIGN PATENT DOCUMENTS

CN    104639867 A    5/2015

OTHER PUBLICATIONS

Disclosed Anonymously, "Online meeting assistance," IP.com, IP.com No. IPCOM000252378D, IP.com Publication Date: Jan. 5, 2018, 5 pages.

(Continued)

*Primary Examiner* — Thomas J Dailey
(74) *Attorney, Agent, or Firm* — Lily Neff

(57) ABSTRACT

A method, computer system, and a computer program product are provided for a restoring missing content to a user that was absent during a portion of a live event. The process will identify the absence period and that is being participated by a user and obtains extracted information relating to the user that was previously gathered from a variety of sources including past user interactions and a user profile. This information is further analyzed and prioritized according to user interest priority determined by the extracted information. This information is categorized into a first set of domains. Information provided during the absence of the user will also be captured and categorized into a second set of domain categories. An intersection between the first and second set of domain categories will be found and prioritized by user interest. This will be presented to the user upon user's return.

17 Claims, 7 Drawing Sheets

(56) References Cited

U.S. PATENT DOCUMENTS

2020/0351550 A1   11/2020  Korupolu
2021/0092168 A1*  3/2021  Ranalli ................. H04M 3/567
2023/0362212 A1* 11/2023  Bradley ................. G10L 15/22
2024/0087606 A1*  3/2024  Miller ................. H04L 12/1831

OTHER PUBLICATIONS

Disclosed Anonymously, "Smart assistance for meetings," IP.com, IP.com No. IPCOM000251788D, IP.com Publication Date: Dec. 4, 2017, 7 pages.

* cited by examiner

| Domain/Category | Primary Location Identifier I | Secondary location identifier I | Primary Location Identifier II | Secondary location identifier II |
|---|---|---|---|---|
| GVT | Page1 | paragraph 3 | n/a | n/a |
| FVT | Page2 | Paragraph 1 | n/a | n/a |
| ICT | Page3 | Paragraph 1 | Page4 | n/a |

Collection Sample 510

| Domain/Category | Primary Location Identifier I | Secondary location identifier I | Primary Location Identifier II | Secondary location identifier II |
|---|---|---|---|---|
| Math | Page1 | Paragraph 5 | Page2 | n/a |
| Physics | n/a | n/a | n/a | n/a |
| Biology | n/a | n/a | n/a | n/a |

Collection Sample 520

FIG. 5

PROGRESS STATUS AFTER INTERRUPTION OF ONLINE SERVICE

BACKGROUND

The present invention relates generally to the field of digital content distribution and more particularly to techniques for providing progress status after interruption on online service.

There has been an explosive growth in services that provide online streaming of digital content. Live streaming of digital content has become very popular. Live streaming can be used in a variety of different ways. For example, live coverage of a sporting event or concert can be provided instantaneously to a large audience. Alternatively, these services can provide smaller audiences the ability to hold teleconferences or live business meetings. Live streaming of content allows people to connect across the globe in real time in a variety of ways. For example, it may be used for classroom use, during court proceedings or business negotiations, among many other things.

Unfortunately, there are often problems that hinder the efficient operation of such live streaming and teleconferencing services. One problem may be caused by an interruption of service such as due to network problems. Another problem may be associated with scheduling issues that force one or more participants to be temporarily absent during a portion of the meeting or the event. During this interrupted or absent period, important information may be missed by one or more users/participants.

SUMMARY

Embodiments of the present invention disclose a method, computer system, and a computer program product for restoring missing content to a user during an absent period while participating an event or conference. In one embodiment, the process identifies the absent period and obtains information relating to the user. The information about the user has been previously gathered from a variety of sources including past user interactions and a user profile and stored in one embodiment in a user profile library. This information is further analyzed and prioritized according to user interest priority and ultimately categorized into a first set of domains. Information is also captured during the absence time period and also categorized into a second set of domain categories. Any intersection between the first and second set of domain categories is then determined and prioritized by user interest. The second set of domain categories that include information provided during the absence period is provided to the user, upon user's return, as prioritized.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings:

FIG. 5 is an example providing two sample domain categories with different identifiers and tags according to one embodiment;

DETAILED DESCRIPTION

Figure 1:
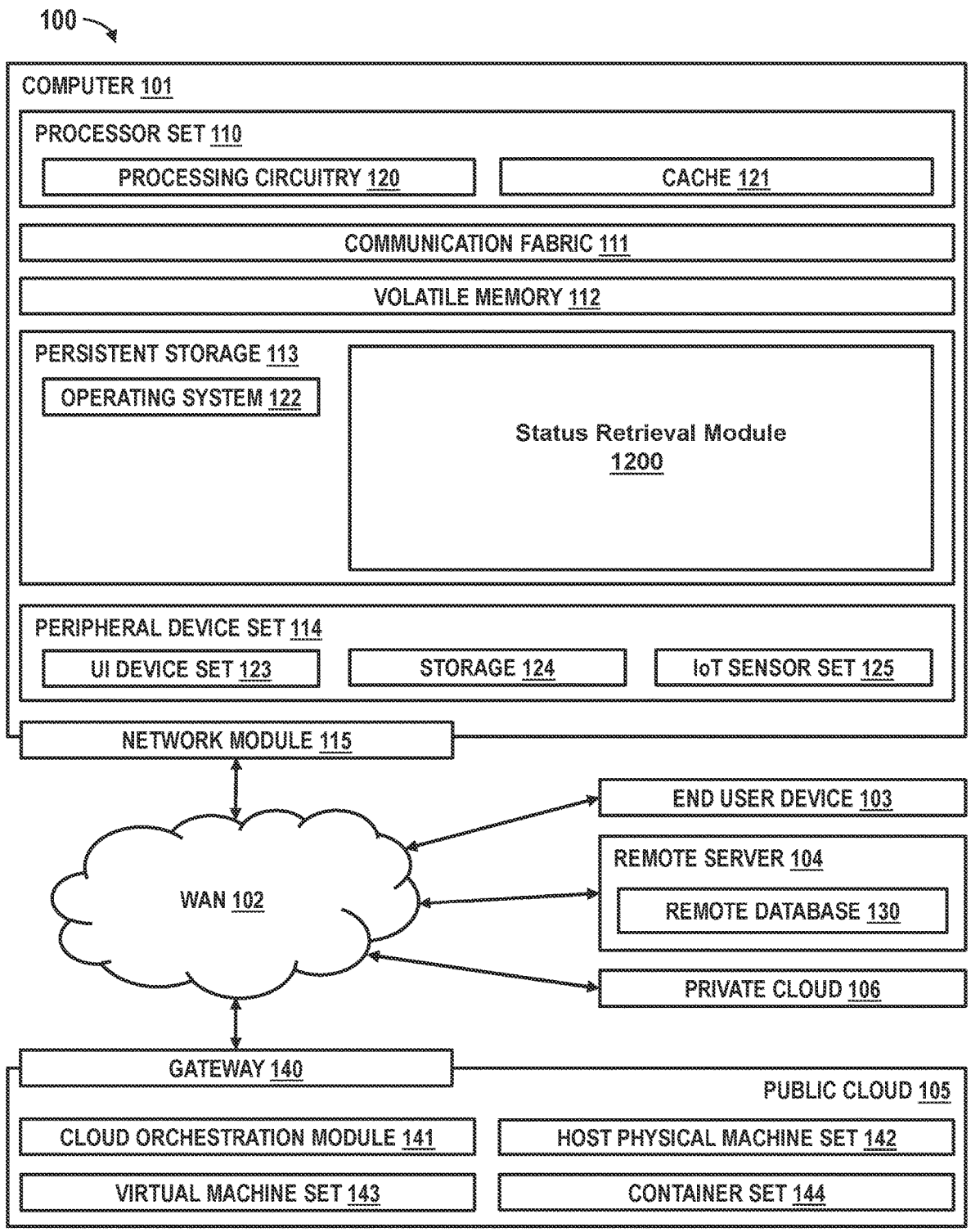
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing a status retrieval module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and rewriting of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
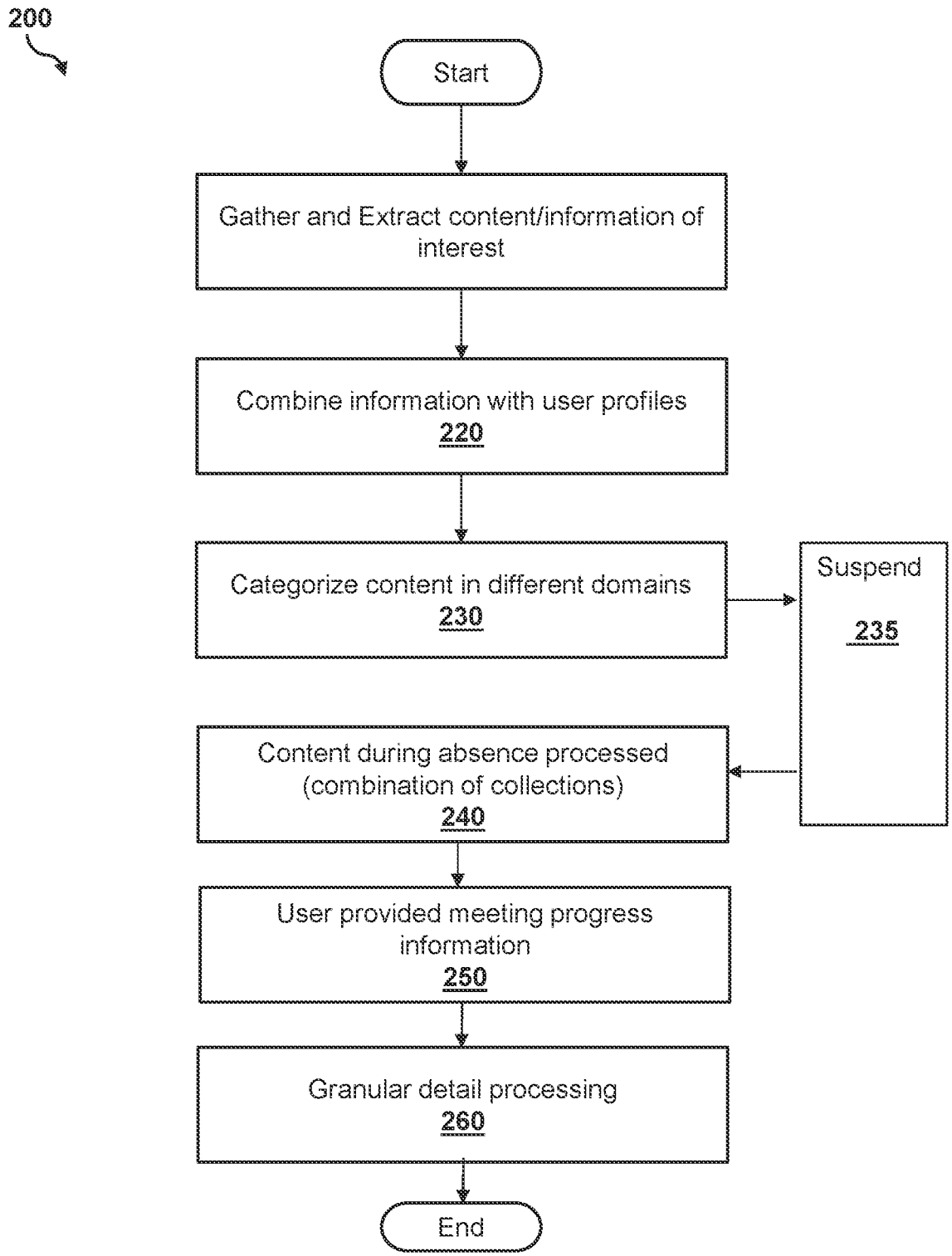
FIG. 2 provides an operational flowchart for a status recovery of missing information to a user during an absence, according to one embodiment.

FIG. 2 provides a flowchart depiction of a process 200 for providing missing content to a user during an absence while participating a live event or conference. The word event will now be used to encompass both an event or a conference or other similar programs as can be appreciated by those skilled in the art. The absence of the user/participant may be intentional or unintentional such as due to an interruption of service etc. The process will identify the absence period and information about the user participant interested in recovering any missed information during the absence. Information about the user is obtained from a user profile or other stored locations (such as a database such as a user profile library). The user information is obtained previously from a variety of sources including past user interactions and user profiles. This information is further analyzed and categorized into a first set of domains that are prioritized according to user interest. The user participation can be monitored to determine the start of an absence time period. A suspension selection can also be made by the user, even if the participation is not monitored, to initiate the start of an absent period. Information is then captured during the absence period. This captured information is then categorized into a second set of domain categories. It is then determined if there is an intersection between the first and second set of domain categories. These intersected domains are then prioritized by user interest and presented to the user upon user's return. Any remaining and un-intersected information in said second set of domain categories is also provided to the user upon return. This process can be broken down in the steps shown in the flowchart as will be further discussed below.

In Step 210, some information is gathered (e.g., extracted) and established about a user. This information can come from a plurality of sources including social media platforms, previous user interactions, user profiles or the like as appreciated by those skilled in the art. In Step 220 this information may be further developed by retrieving associated information about the particular user such as from a user profile. In one embodiment, the user profile can be located in a database. This could be collected before a service interruption during attending a conference or meeting or while viewing a live stream or other similar arrangement as can be appreciated by those skilled in the art.

In Step 230, information that is extracted and combined relating to a particular content that the user is interested in is then categorized. In one embodiment, this can be categorized into different domain collections or datasets.

Figure 7:
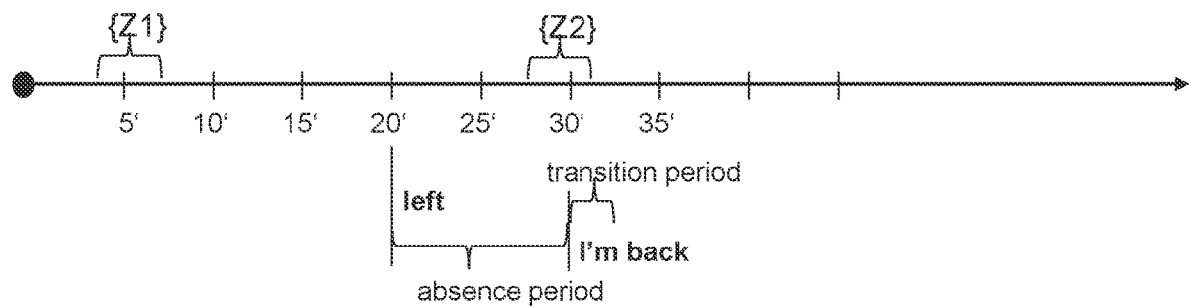
FIG. 7 is a graphical illustration of a sample timeline of an event according to one embodiment.

In Step 235, an interruption of service occurs. This interruption can be involuntary and unexpected and not in control of the user. Alternatively, the interruption may be controlled by the user. For example, the user needs to temporarily walk away from viewing or participating in the meeting/streaming. In such a case, the user can suspend the viewing or participating. Such an example is provided in FIG. 7, when an event was being held for over 35 minutes. The user was absent or interrupted between the 20-minute and 30-minute mark. There was a brief transition period (of a few seconds to a minute or two) displayed between "I am back" and full restoration. In this example, this will lead to a playback period where the user will be provided with all missed information as will be discussed in more detail below.

Returning back to FIG. 2, in Step 240, the content is being captured during the absence period. This content will be is processed in the form of a combination of collections (datasets) and user profile.

In Step 250, upon user's return (or once the service is reconnected) the user can effectively connect to the meeting progress and pick the content up in short time after returning to the meeting (playback) by order of interest as was summarized above. A more detailed explanation will be provided in conjunction with FIGS. 5 and 6.

In Step 260, more granular detail processing can be performed on the playback content during the connection time period according to the user's preferences. This will be discussed in further detail below.

In addition, to make the Steps 230-260 easier to understand, the following example is provided. In this example, a scenario is presented where the event is a live teleconference call. In this scenario, the user sends or receives a meeting invitation and participants (e.g., the user if on the receiving end of the meeting invitation) will then accept the invitation. In this scenario, the event is a live but on-line meeting so a tool is launched and the participants, including the user joins the meeting. During the meeting, the user receives an important phone call and decides to suspend the meeting to temporarily leave. In traditional situations, the user would miss any content during the time of user's absence. In this scenario, once the user decides to elect a suspension option (in one scenario this can be accomplished by selecting a "Suspend" button), a backend server starts to analyze and process the meeting content, so that the user can effectively connect to the meeting progress and pick the content up in short time after returning.

In another embodiment, when there is an interruption (unintended), a recall to the meeting or live stream can record the contents and present it to the user by selecting a recall. In another embodiment, the user may be participating but still unintentionally miss some important content. In each case, the information can be extracted and by establishing the user's interest as described previously, the important content can be presented by an order of previously determined importance to the user.

Figure 3:
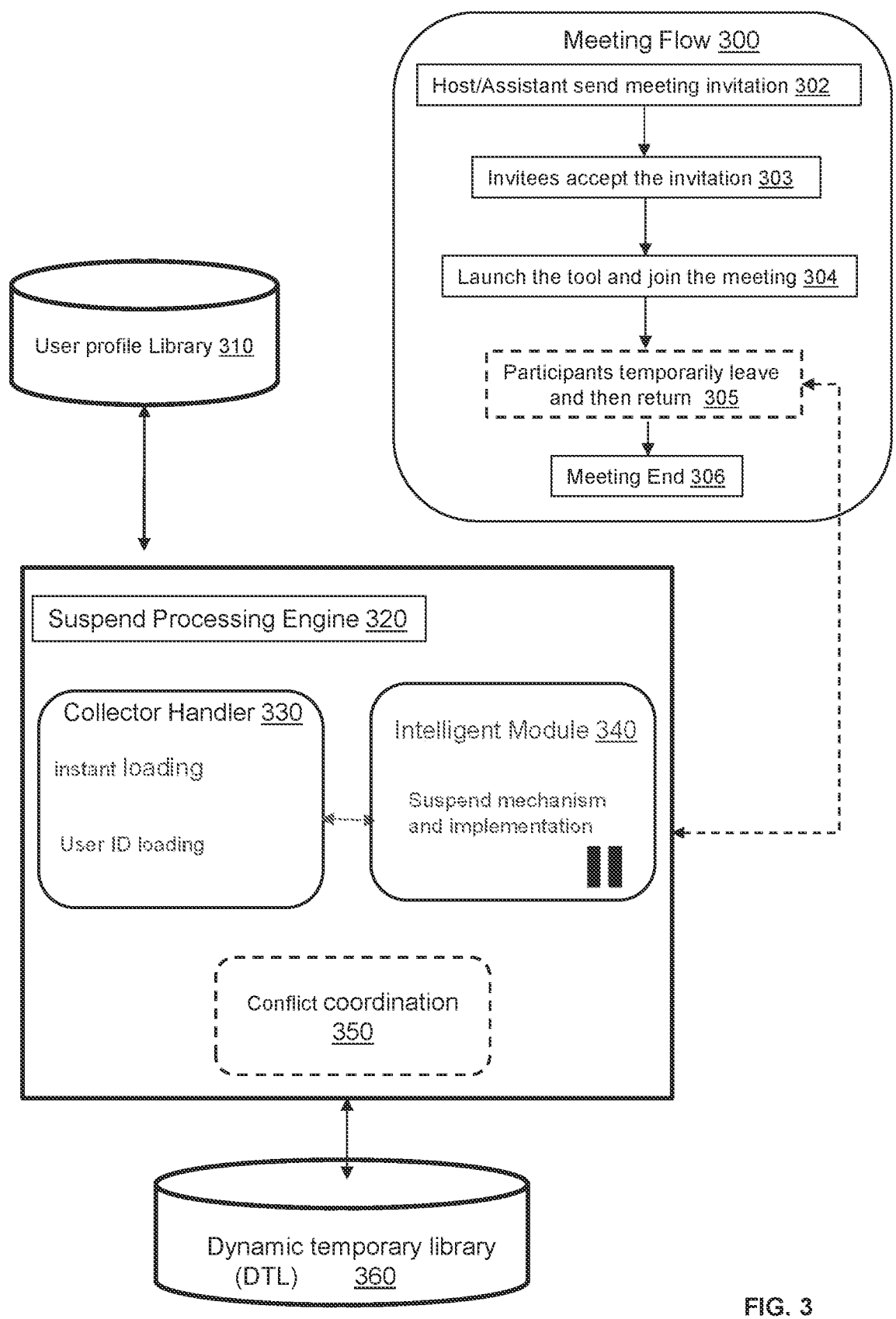
FIG. 3 provides a block diagram illustrating suspension process, according to one embodiment.

FIG. 3 provides some of the suspension process in further detail. The Meeting flow 300 (302-306) is similar to what is discussed in the Steps of FIG. 2. The Suspension or interruption occurs at a location referenced in FIG. 3 as 305. A User profile Library 310 provides information about the user, or as associated with a user profile.

Enacting the Suspension at 305 (or alternatively an unintentional interruption) causes the engagement of the Suspend Processing Engine 320. The Suspend Processing Engine 320 has a Collector handler 330 used for instant loading of information such as from the meeting or a home page etc. It can also provide loading of user information. Another component, the Intelligent Module 340 component is used for processing the suspension/re-engagement of meeting or streaming participation (in the functionality). The suspend mechanism commences a variety of different information gathering and processing. This may include the loading of User data and load and gathering of meeting information and categorizing them. Information gathered that may need to be at least temporarily stored until the user's return will be provided by a Dynamic Temporary Library 360. Any conflict for storage of information with be also handled by another component labeled as Conflict Coordination component 360 in the Suspend Processing Engine 320. These functions are provided in greater detail in FIGS. 4-6 as will be discussed.

Figure 4:
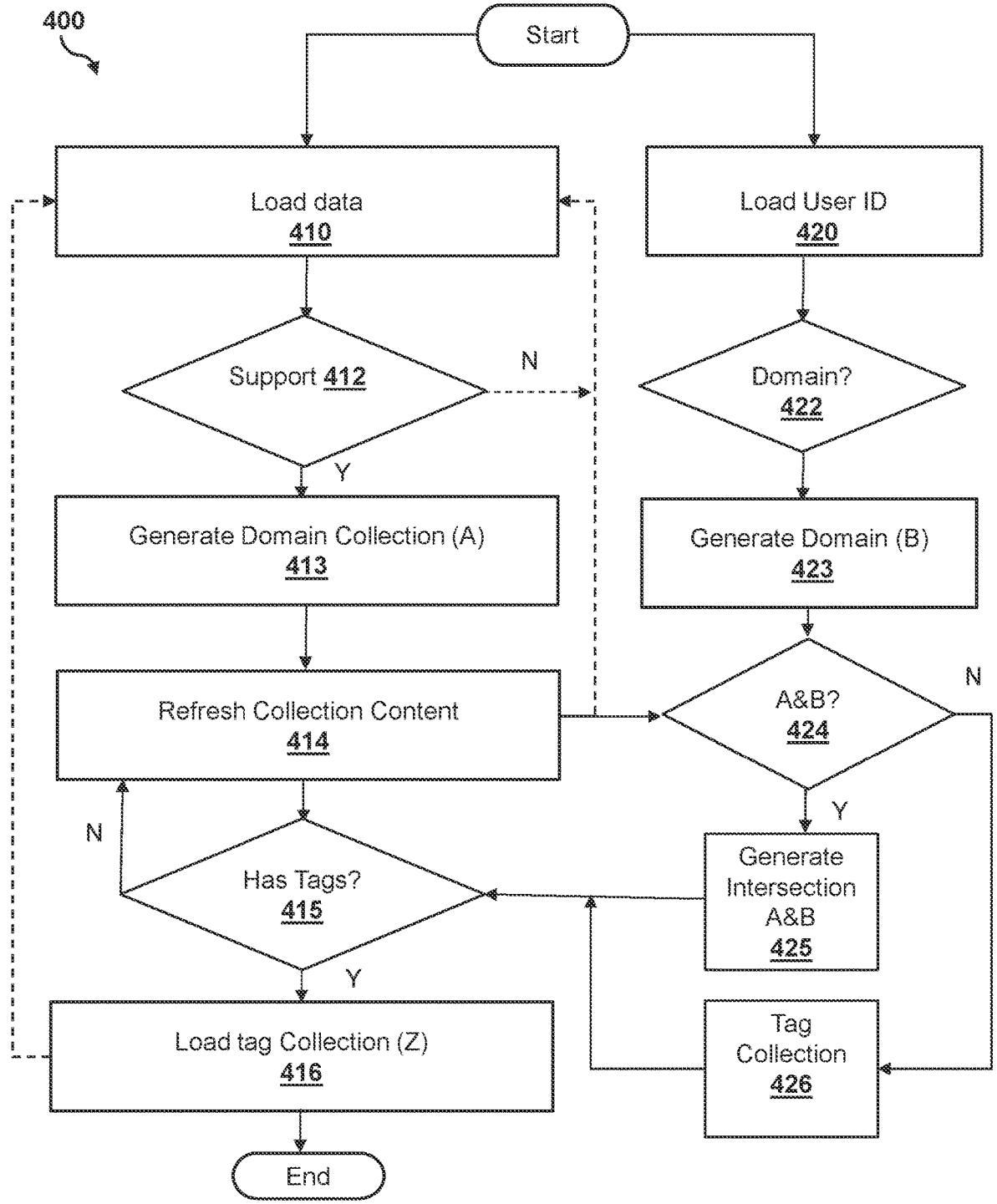
FIG. 4 provides a more detailed flow diagram of the embodiment of FIG. 2.

FIG. 4 provides a flowchart of a process 400 that is similar to that of the process 200 of FIG. 2 but with more detail. In 400, there are two paths that collect, and load data or User ID as shown in FIG. 3 once the suspend/interrupt is received (Suspend Processing Engine 320). The left side, obtains and loads relevant data (410-416) and the right side similarly obtains and loads User ID (420-426).

On the left side, the process moves by determining if sufficient support (412) is provided for the collection and generation of domain collection (A) as shown at 413. When sufficient information is collected, the data will be refreshed. Tags are checked at Step 415 and later when the data will be tagged (424-426) and checked for tags being valuable (414) before loading the collection (416) such as for temporary storage. In Step 422, as denoted by the decision box, different types of tags are provided. When domain is not generated, the tag collection reverts back to tags A (as there will be no tagging of collection B-no domain B).

A similar process occurs on the other side of the process where user ID is loaded at 410 and checked to ensure domain of user concerns are provided (412). Then a similar domain of collected user concerns are generated (413).

The two sides generate different domains A (413) and B (423). The decision box 424 analyzes and determines if both domains A and B have been generated. When both A and B exist, the process moves to Step 425 to generate an intersection between them. When both do not exist, the process moves to Step 426 to collect and tag the domain that is present (most likely A). In either case, both Steps 425 and 426 proceed to decision box 415 to ensure that tags have been provided or the process loops back to Step 414. Once the existence of tags are checked, the tag is loaded and the process continues by either loading the next data or if no other exists by ending it.

FIG. 5 is an example showing two possible sample categories 510, and 520 with different identifiers and tags. Each example provides a number of location identifiers and categories used to generate intersections referenced in FIG. 4.

Figure 6:
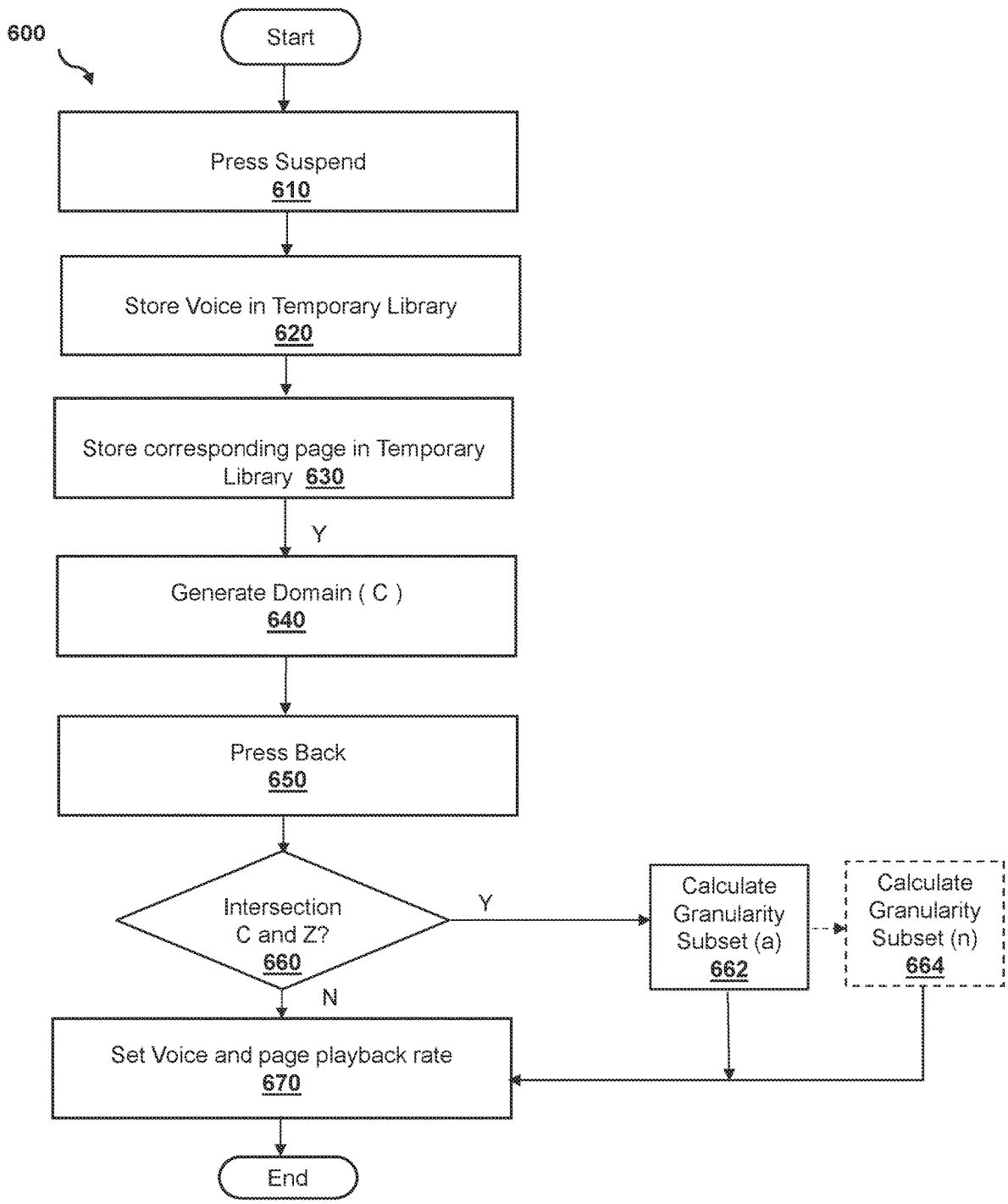
FIG. 6 provides a flowchart depiction of an alternate embodiment illustrating a more detailed process after a suspension election, according to one embodiment.

FIG. 6 provides another more detailed embodiment of the process 600 starting at the suspension election. As referenced, the process starts with Step 610 when the suspend is pressed or interruption commenced. When there is an oral event, the voice or oral component of the event can be stored in a temporary library as shown at Step 620. Any corresponding frame (page, text etc.) can also be stored associated with the voice/oral component in the temporary library as well as shown at Step 630. Domain collection is then provided associated with this period and the storage of information (Step 640).

In Step 650, the user indicates that the absence period has ended and that the user is back. At this point all domain collection will be reviewed to see if there are any intersections as shown at Step 660. Granularity of information is then calculated for one or more subsets of data as shown at Steps 672 and 674. It should be noted that C is defined as a set of domains that are involved in providing the meeting content after the user selects to suspend the meeting. Z is defined as the domain in which users are interested in the entire conference content (equal to A, equal to the intersection of A and B).

Granularity provides the level of detail while the amount of time of absence are both important in restoring efficient information to the user. In one embodiment, the total time required for playback is calculated as well as the connection time "R". In this case, the connection time "R" is calculated by getting the total time required for playback:

$$T = \text{Sum}(t[n]/s[n])$$

$$R = T + G(T, e)$$

G( ) is the time required to catch up with the progress of the meeting (the content of the meeting within T time) after the playback is finished. Similarly, e=the speed of playing the meeting content within T time to catch up with the progress:

"e" can be set by the user (e>1)

Assume e=2

$$G(T, 2) = T(1/2 + 1/4 + 1/8 + 1/16 + \ldots) = T$$

Assume e=1.5

$$G(T, 1.5) = T(2/3 + 4/9 + 8/27 + 16/81 + \ldots) = 2T$$

Besides time of playback the granularity of content must also be determined. The length of playback can be selective such as determined by a system or the user or user preferences. However, the length of the playback can determine the level of granularity of information that can be provided. Conversely, the desired granularity can also affect the length of the playback. In other words, based on a number of factors and dependent on playback preferences, granular detail processing can be performed on the playback content.

In one embodiment, an algorithm can be used that calculates content weight and playback time for each subset: w=W(V, t) where:

W: A function that calculates its own weight

V: The correlation between the content of the subset and the user's field of interest, the greater the "V", the greater the "w", and t: The content time length of the subset, the larger the "t", the larger the "w"

For subsets with heavy weights, playback is slower (e.g. s [1]=1.5× speed) and for subsets with small weights, playback is faster (e.g. s [2]=2× speed.)

The playback granularity of subset w [n]=t [n]/s [n] and the total time required for playback is calculated as: T=Sum (t [n]/s [n])

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for providing missed content during an on-going event, comprising:

monitoring a user participation in an on-going event and capturing information during a user absent time period during said an on-going event, wherein said absent time period is determined by detection of user absence from attendance of said on-going event or by a selection made by said user for not monitoring said on-going event attendance;

obtaining information about a user previously gathered from a user's past interactions and a user profile;

categorizing said obtained information into a first set of domain categories and prioritizing said categories based on a user interest as determined by obtained information about said user;

determining an intersection between a second set of domain categories and said first set and prioritizing any intersected second set of domain categories based on one or more user interest determined previously, wherein information captured in any additional second set of domain categories determined not to be intersection with said first set of domain categories is presented to said user after said intersected second set of domain categories;

calculating amount of data granularity needed to provide to said user information about said on-going event upon return of said user to said on-going event, wherein said calculation is made by determining a relationship between a content weight user interest and length of playback desired and data granularity is an amount of intersection between said first and second domain categories, wherein length of playback can vary according to a corresponding data granularity selected by the user;

providing said user upon return to said on-going event and while an on-going meeting is still on-going, through presenting prioritized of said second set of domain categories according to calculated granularity, information captured during said user absent time period.

2. The method of claim 1, wherein said user is provided with information captured during said absent time period during a playback period.

3. The method of claim 2, wherein said information obtained about said user is gathered about said user from a plurality of sources and stored in a user profile library, and wherein information captured is stored in a temporary library.

4. The method of claim 2, wherein a length of playback is determined by one or more user preferences.

5. The method of claim 4, wherein said length of playback determines a granularity of information provided during said playback, wherein said granularity is a level of detail.

6. The method of claim 3, wherein said user absent period is also calculated as part of granularity and playback time.

7. A computer system for missed content during an event, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform:

monitoring a user participation in an on-going event and capturing information during a user absent time period during said an on-going event, wherein said absent time period is determined by detection of user absence from attendance of said on-going event or by a selection made by said user for not monitoring said on-going event attendance;

obtaining information about a user previously gathered from a user's past interactions and a user profile;

categorizing said obtained information into a first set of domain categories and prioritizing said categories based on a user interest as determined by obtained information about said user;

determining an intersection between a second set of domain categories and said first set and prioritizing any intersected second set of domain categories based on one or more user interest determined previously, wherein information captured in any additional second set of domain categories determined not to be intersection with said first set of domain categories is presented to said user after said intersected second set of domain categories;

calculating amount of data granularity needed to provide to said user information about said on-going event upon return of said user to said on-going event, wherein said calculation is made by determining a relationship between a content weight, user interest and length of playback desired and data granularity is an amount of intersection between said first and second domain categories, wherein length of playback can vary according to a corresponding data granularity selected by the user;

providing said user upon return to said on-going event and while an on-going meeting is still on-going, through presenting prioritized of said second set of domain categories according to calculated granularity, information captured during said user absent time period.

8. The computer system of claim 7, wherein said user is provided with information captured during said absent time period during a playback period.

9. The computer system of claim 8, wherein said information obtained about said user is gathered about said user from a plurality of sources and stored in a user profile library, and wherein information captured is stored in a temporary library.

10. The computer system of claim 8, wherein a length of playback is determined by one or more user preferences.

11. Computer system of claim 10, wherein said length of playback determines a granularity of information provided during said playback, wherein said granularity is a level of detail.

12. The computer system of claim 11, said user absent period is also calculated as part of granularity and playback time.

13. A computer program product for missed content during an event, comprising:

one or more non-transitory computer-readable storage medium and program instructions, the program instructions executable by a processor, the program instructions comprising:

monitoring a user participation in an on-going event and capturing information during a user absent time period during said an on-going event; wherein said absent time period is determined by detection of user absence from attendance of said on-going event or by a selection made by said user for not monitoring said on-going event attendance;

obtaining information about a user previously gathered from a user's past interactions and a user profile;

categorizing said obtained information into a first set of domain categories and prioritizing said categories based on a user interest as determined by obtained information about said user;

determining an intersection between a second set of domain categories and said first set and prioritizing any intersected second set of domain categories based on one or more user interest determined previously, wherein information captured in any additional second set of domain categories determined not to be intersection with said first set of domain categories is presented to said user after said intersected second set of domain categories;

calculating amount of data granularity needed to provide to said user information about said on-going event upon return of said user to said on-going event, wherein said calculation is made by determining a relationship between a content weight, user interest and length of playback desired and data granularity is an amount of intersection between said first and second domain categories, wherein length of playback can vary according to a corresponding data granularity selected by the user, providing said user upon return to said on-going event and while an on-going meeting is still on-going, through presenting prioritized of said second set of domain categories according to calculated granularity, information captured during said user absent time period.

14. The computer program product of claim 13, wherein said user is provided with information captured during said absent time period during a playback period.

15. The computer program product of claim 13, wherein information obtained about any user is gathered about said user from a plurality of sources and stored in a user profile library, and wherein information captured is stored in a temporary library.

16. The computer program product of claim 15, wherein said a length of playback determines a granularity of information provided during said playback, wherein said granularity is a level of detail.

17. The computer program product of claim 16, absent period of any is also calculated as part of granularity and playback time.

* * * * *